US012420834B2

(12) United States Patent
Funai

(10) Patent No.: US 12,420,834 B2
(45) Date of Patent: Sep. 23, 2025

(54) ELECTRONIC CONTROL DEVICE AND VEHICLE CONTROL SYSTEM

(71) Applicant: HITACHI ASTEMO, LTD., Hitachinaka (JP)

(72) Inventor: Hirokazu Funai, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 131 days.

(21) Appl. No.: 18/254,648

(22) PCT Filed: Sep. 7, 2021

(86) PCT No.: PCT/JP2021/032829
§ 371 (c)(1),
(2) Date: May 26, 2023

(87) PCT Pub. No.: WO2022/162996
PCT Pub. Date: Aug. 4, 2022

(65) Prior Publication Data
US 2024/0017742 A1    Jan. 18, 2024

(30) Foreign Application Priority Data

Jan. 27, 2021   (JP) ................................. 2021-010773

(51) Int. Cl.
*B60W 60/00*    (2020.01)
*B60W 10/18*    (2012.01)
(Continued)

(52) U.S. Cl.
CPC ........ *B60W 60/0015* (2020.02); *B60W 10/18* (2013.01); *B60W 10/20* (2013.01);
(Continued)

(58) Field of Classification Search
CPC ....... B60W 60/0015; B60W 30/18159; B60W 10/18; B60W 10/20; B60W 30/0953;
(Continued)

(56) References Cited

U.S. PATENT DOCUMENTS

2012/0022716 A1   1/2012   Kitahama et al.
2017/0039865 A1   2/2017   Takabayashi et al.
(Continued)

FOREIGN PATENT DOCUMENTS

JP    2019-053633 A    4/2019
JP    2020-050105 A    4/2020
(Continued)

OTHER PUBLICATIONS

International Search Report with English Translation and Written Opinion of International Patent Application No. PCT/JP2021/032829 dated Nov. 22, 2021 (9 pages).

*Primary Examiner* — Michael D Lang
(74) *Attorney, Agent, or Firm* — Foley & Lardner LLP

(57) ABSTRACT

The present disclosure provides an electronic control device and a vehicle control system capable of coping with an increase in communication load, caused by an increase in the number of objects to be monitored, and an increase in processing load at the time of acquiring surrounding monitoring information. An electronic control device 110 according to the present disclosure is mounted on a vehicle V and includes a scene prediction unit 111 and a filtering unit 112. The scene prediction unit 111 predicts driving scenes to be encountered by the vehicle V based on position information of the vehicle V, map information around the vehicle V, and a travel route of the vehicle V. The filtering unit 112 derives a risk index for each of recognition results of a plurality of objects around the vehicle V based on the driving scenes, the recognition results of the objects, and risk information in which the risk index is defined for each of the driving scenes (Continued)

and each of types of the recognition results of the objects. Furthermore, the filtering unit 112 selectively passes the recognition result of the object having the risk index exceeding the prescribed value.

6 Claims, 7 Drawing Sheets

(51) Int. Cl.
*B60W 10/20* (2006.01)
*B60W 30/095* (2012.01)
*B60W 30/18* (2012.01)
*B60W 50/00* (2006.01)
*G08G 1/16* (2006.01)

(52) U.S. Cl.
CPC .... *B60W 30/0953* (2013.01); *B60W 30/0956* (2013.01); *B60W 30/18159* (2020.02); *B60W 30/18163* (2013.01); *B60W 50/0097* (2013.01); *G08G 1/16* (2013.01); *B60W 2554/4029* (2020.02)

(58) Field of Classification Search
CPC ....... B60W 30/0956; B60W 30/18163; B60W 50/0097; B60W 2554/4029; G08G 1/16
See application file for complete search history.

(56) References Cited

U.S. PATENT DOCUMENTS

2018/0144201 A1* 5/2018 Yoshihira ............. G06V 20/588
2019/0084558 A1 3/2019 Kaminade et al.

FOREIGN PATENT DOCUMENTS

WO WO-2010/098449 A1 9/2010
WO WO-2015/155874 A1 10/2015

* cited by examiner

| SEVERITY | | | | |
|---|---|---|---|---|
| INDEX | S0 | S1 | S2 | S3 |
| NOTES | NONE | SMALL | MEDIUM | LARGE |

T2 —

| CONTROLLABILITY | | | | |
|---|---|---|---|---|
| INDEX | C0 | C1 | C2 | C3 |
| NOTES | HIGH | MEDIUM | LOW | NONE |

T3 —

| EXPOSURE | | | | | |
|---|---|---|---|---|---|
| INDEX | E0 | E1 | E2 | E3 | E4 |
| NOTES | EXTREMELY RARE | ONCE/YEAR | SEVERAL TIMES/YEAR | SEVERAL TIMES/MONTH | FREQUENT |

T4 —

| SEVERITY | | EXPOSURE | CONTROLLABILITY | | |
|---|---|---|---|---|---|
| | | | C1 | C2 | C3 |
| | S1 | E1 | QM | QM | QM |
| | | E2 | QM | QM | QM |
| | | E3 | QM | QM | A |
| | | E4 | QM | A | B |
| | S2 | E1 | QM | QM | QM |
| | | E2 | QM | QM | A |
| | | E3 | QM | A | B |
| | | E4 | A | B | C |
| | S3 | E1 | QM | QM | A |
| | | E2 | QM | A | B |
| | | E3 | A | B | C |
| | | E4 | B | C | D |

| TYPE | DRIVING SCENE | | | | | |
|---|---|---|---|---|---|---|
| | STRAIGHT TRAVELING AT INTERSECTION | LEFT TURN AT INTERSECTION | RIGHT TURN AT INTERSECTION | LANE CHANGE | CROSSWALK PASSAGE | ... |
| Sgn1 | D | D | D | QM | D | ... |
| Sgn2 | QM | QM | QM | B | B | ... |
| Sgn3 | QM | QM | QM | D | QM | ... |
| ... | ... | ... | ... | ... | ... | ... |
| SgnN | A | A | A | QM | D | ... |

ELECTRONIC CONTROL DEVICE AND VEHICLE CONTROL SYSTEM

TECHNICAL FIELD

The present disclosure relates to an electronic control device and a vehicle control system.

BACKGROUND ART

Conventionally, an invention related to a vehicle surrounding monitoring device for monitoring around an own vehicle (PTL 1 below). The vehicle surrounding monitoring device described in PTL 1 is provided in a driving support system having a driving support control means, and supplies surrounding monitoring information to the driving support control means (claim 1 and the like in PTL 1). Note that the driving support control means performs a safety driving support control for issuing an alarm when there is a possibility that the own vehicle collides with a moving object relatively approaching the own vehicle, and an operation driving support control for supporting an operation for making the own vehicle to move in a lateral direction.

This conventional vehicle surrounding monitoring device includes a moving object detecting means, a first selecting means, a second selecting means, and an information providing means. The moving object detecting means detects a moving object moving around the own vehicle. The first selecting means preferentially selects, among the moving objects detected by the moving object detecting means, a predetermined first number of the moving objects with the highest priority in ascending order of a predicted collision time of each of the moving objects relatively approaching the own vehicle, the predicted collision time indicative of a predicted time which it takes for the moving object to collide with the own vehicle.

The second selecting means selects, among the moving objects detected by the moving object detecting means other than the moving objects selected by the first selecting means, a predetermined second number of the moving objects with the second highest priority in ascending order of a relative distance of each of the moving objects between the moving object and the own vehicle. The information providing means supplies information on the moving objects selected by the first selecting means and the moving objects selected by the second selecting means as the surrounding monitoring information to the driving support control means.

CITATION LIST

Patent Literature

PTL 1: JP 2019-053633 A

SUMMARY OF INVENTION

Technical Problem

In the conventional vehicle surrounding monitoring device, the surrounding monitoring information is information on an object to be monitored selected from three-dimensional objects detected by a surrounding sensor such as a radar (paragraph 0007, paragraph 0124, and the like in PTL 1). In the conventional vehicle surrounding monitoring device, however, it is not assumed that a communication load increases due to an increase in the number of objects to be monitored and a processing load increases at the time of acquiring the surrounding monitoring information, for example, in a case where the own vehicle travels in a downtown or an intersection and the like.

The present disclosure provides an electronic control device and a vehicle control system capable of coping with an increase in communication load, caused by an increase in the number of objects to be monitored, and an increase in processing load at the time of acquiring surrounding monitoring information.

Solution to Problem

One aspect of the present disclosure is an electronic control device mounted on a vehicle, the electronic control device including: a scene prediction unit that predicts driving scenes to be encountered by the vehicle based on position information of the vehicle, map information around the vehicle, and a travel route of the vehicle; and a filtering unit that derives a risk index for each of recognition results of a plurality of objects around the vehicle based on the driving scenes, the recognition results of the objects, and risk information in which the risk index is defined for each of the driving scenes and each of types of the recognition results of the objects, and selectively pass the recognition result of the object having the risk index exceeding a prescribed value.

Advantageous Effects of Invention

According to the above aspect of the present disclosure, it is possible to the electronic control device and the vehicle control system capable of coping with the increase in communication load, caused by the increase in the number of objects to be monitored, and the increase in processing load at the time of acquiring surrounding monitoring information.

BRIEF DESCRIPTION OF DRAWINGS

FIG. 4 is a table illustrating exemplary risk indices used in a filtering process in FIG. 3.

FIG. 5 is a table illustrating exemplary risk information used in the filtering process in FIG. 3.

DESCRIPTION OF EMBODIMENTS

Hereinafter, an embodiment of an electronic control device and a vehicle control system according to the present disclosure will be described with reference to the drawings.

Figure 1:
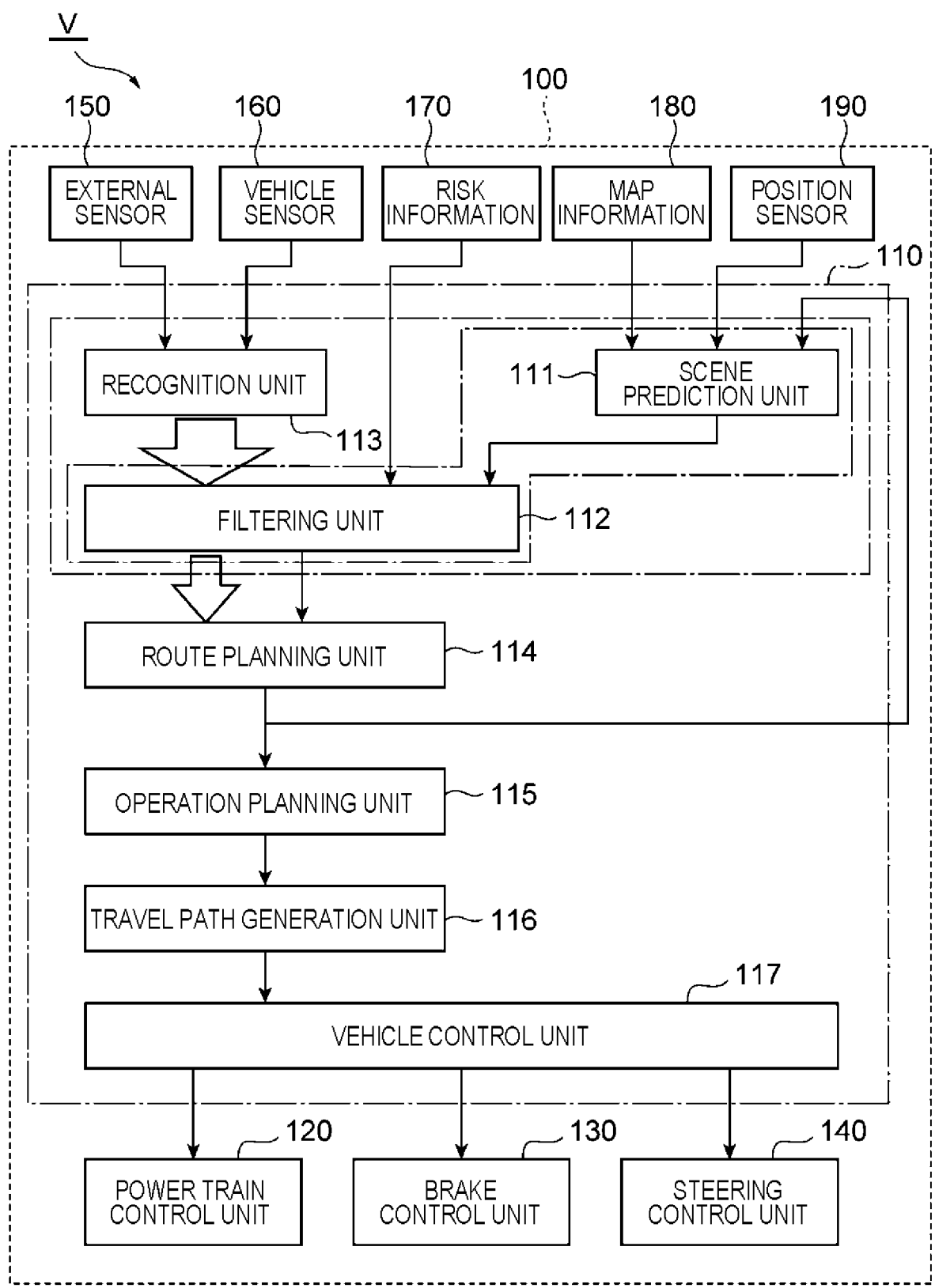
FIG. 1 is a block diagram illustrating an embodiment of an electronic control device and a vehicle control system of the present disclosure.

FIG. 1 is a block diagram illustrating the embodiment of the electronic control device and the vehicle control system of the present disclosure. An electronic control device 110 of the present embodiment is mounted on a vehicle V, for example, and constitutes a part of a vehicle control system 100. The electronic control device 110 is configured using, for example, a microcomputer including a central processing unit (CPU), a memory, a program, a timer, and an input/output unit, and is a vehicle control device configured to perform advanced driving assistance and autonomous driving of the vehicle V.

The vehicle V is, for example, a gasoline engine vehicle, a diesel engine vehicle, a hybrid vehicle, an electric vehicle, or a hydrogen vehicle, and includes an external sensor 150, a vehicle sensor 160, a risk information storage unit 170, a map information storage unit 180, and a position sensor 190. Illustration and description regarding the other general configurations of the vehicle V will be omitted.

The external sensor 150 includes, for example, a monocular camera, a stereo camera, a laser radar, a millimeter wave radar, an ultrasonic sensor, and the like, and detects an object around the vehicle V. For example, the external sensor 150 outputs detection results such as an image, a shape, a size, a distance, a direction, a relative speed, and a moving direction of the object around the vehicle V to the electronic control device 110.

The vehicle sensor 160 includes, for example, a wheel speed sensor, an acceleration sensor, a gyro sensor, an accelerator sensor, a brake sensor, a steering angle sensor, and the like, and detects vehicle information such as a speed, an acceleration, an angular velocity, an accelerator operation amount, a brake operation amount, and a steering angle of the vehicle V. The vehicle sensor 160 outputs, for example, detection results of the vehicle information to the electronic control device 110.

The risk information storage unit 170 is, for example, a non-volatile memory mounted on the vehicle V, and stores risk information to be described later. In the example illustrated in FIG. 1, the risk information storage unit 170 is provided outside the electronic control device 110, but the electronic control device 110 may include the risk information storage unit 170. In addition, when the vehicle V or the electronic control device 110 does not include the risk information storage unit 170, the electronic control device 110 may communicate with an external server of the vehicle V via a communication unit mounted on the vehicle V and acquire risk information from the external server, for example.

The map information storage unit 180 is, for example, a non-volatile memory mounted on the vehicle V, and stores map information such as high-precision map information. The position sensor 190 is, for example, a receiver of a global positioning satellite system (GNSS), receives a radio wave from a satellite, acquires position information of the vehicle V, and outputs the position information to the electronic control device 110. Note that each of the map information storage unit 180 and the position sensor 190 may be, for example, a part of a car navigation system mounted on the vehicle V.

The electronic control device 110 according to the present embodiment includes at least a scene prediction unit 111 and a filtering unit 112. In addition, the electronic control device 110 may further include a recognition unit 113. In addition, the electronic control device 110 may further include a route planning unit 114, an operation planning unit 115, a travel path generation unit 116, and a vehicle control unit 117.

In addition, the vehicle control system 100 of the present embodiment includes, for example, the electronic control device 110, a power train control unit 120, a brake control unit 130, and a steering control unit 140. In addition, the vehicle control system 100 may further include, for example, the external sensor 150, the vehicle sensor 160, the risk information storage unit 170, the map information storage unit 180, and the position sensor 190.

Each unit of the electronic control device 110 illustrated in FIG. 1 represents, for example, each function of the electronic control device 110 implemented as a CPU executes a program stored in a memory. Note that the example illustrated in FIG. 1 illustrates an example in which each unit (each function) is implemented in one electronic control device 110, the scene prediction unit 111 and the filtering unit 112 and the other respective units can be implemented by being divided into a plurality of different electronic control devices.

The recognition unit 113 recognizes a plurality of objects around the vehicle V using detection results of the external sensor 150 mounted on the vehicle V. Specifically, the recognition unit 113 integrates, for example, the objects, boundaries, traffic light information, and the like detected by sensing equipment such as a camera and a radar included in the external sensor 150. Furthermore, the recognition unit 113 classifies the detected objects. More specifically, for example, the recognition unit 113 classifies and the detected objects into categories such as a person, a car, a motorcycle, and a bicycle and performs recognition. The recognition unit 113 outputs object recognition results using such detection results of the external sensor 150 to the filtering unit 112.

Figure 2:
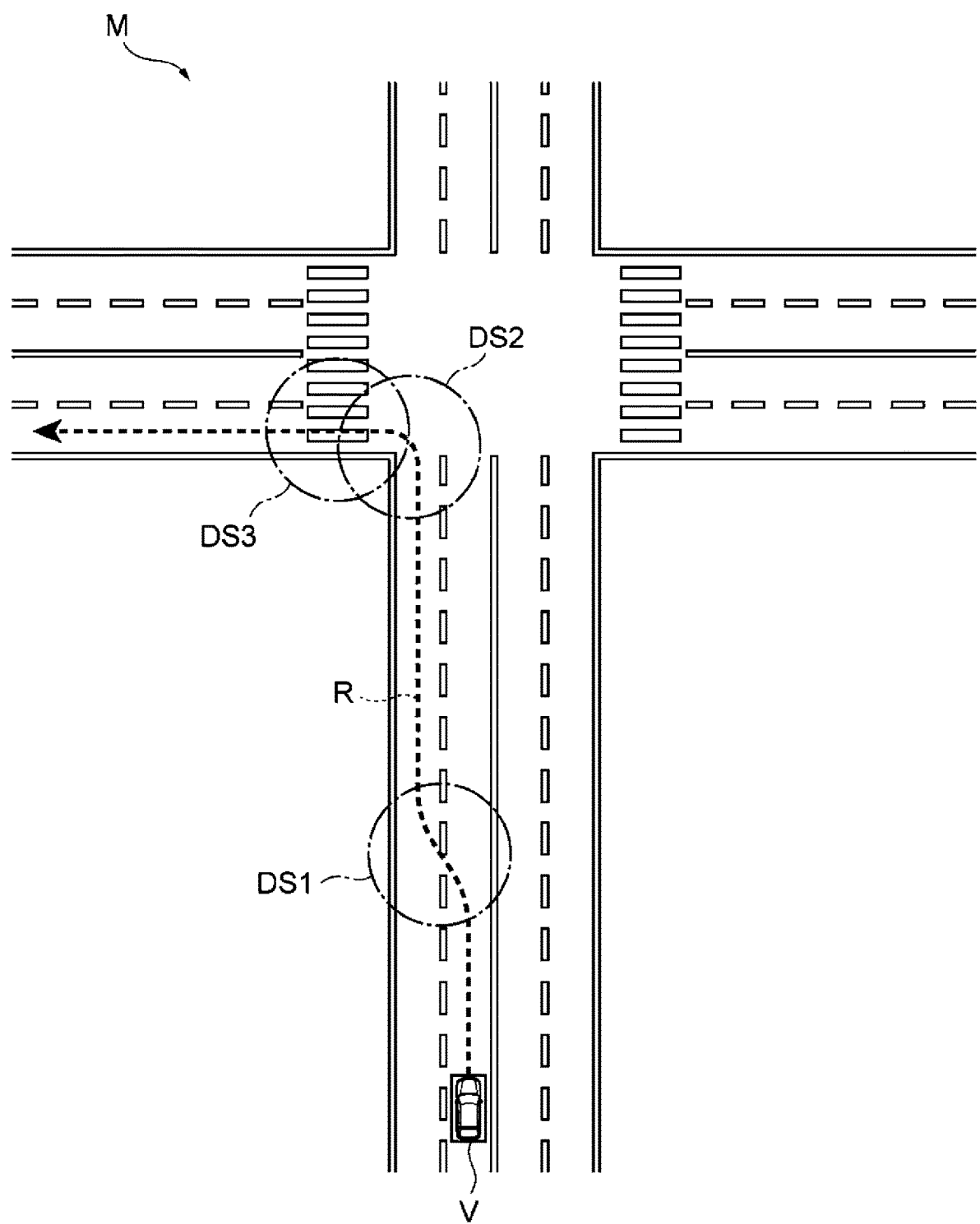
FIG. 2 is a plan view illustrating an example of a driving scene predicted by a scene prediction unit in FIG. 1.

FIG. 2 is a plan view illustrating exemplary driving scenes DS1, DS2, and DS3 predicted by the scene prediction unit 111 of FIG. 1. The scene prediction unit 111 predicts a driving scene to be encountered by the vehicle V based on, for example, position information of the vehicle V acquired from the position sensor 190, map information M around the vehicle V acquired from the map information storage unit 180, and a travel route R of the vehicle V acquired from the route planning unit 114. The scene prediction unit 111 predicts the driving scenes DS1, DS2, and DS3 to be encountered by the vehicle V within a range in which a travel distance from the vehicle V is within a predetermined distance, for example, 1 [km] along the travel route R.

In the example illustrated in FIG. 2, the driving scene DS1 to be encountered by the vehicle V first is, for example, a lane change from a right lane to a left lane at a point at the distance of 300 [m] along the travel route R ahead of the vehicle V traveling on a road having two lanes on each side in the right-hand driving traffic system. The driving scene DS2 to be encountered by the vehicle V second is, for example, a left turn at an intersection at a point at the distance of 600 [m] along the travel route R ahead of the vehicle V. The driving scene DS3 to be encountered by the vehicle V last is, for example, crosswalk passage at a point at the distance of 620 [m] along the travel route R ahead of the vehicle V.

In this case, for example, as the predicted driving scenes DS1, DS2, and DS3, the scene prediction unit 111 outputs the "lane change", the "left turn at an intersection", and the "crosswalk passage" to the filtering unit 112 together with the distance on the travel route R ahead of the vehicle V. In this manner, the driving scenes predicted by the scene prediction unit 111 can include, for example, straight traveling at an intersection, a left turn and a right turn, a lane change, crosswalk passage, traveling in a downtown, traveling in a residential area, traveling on an expressway or a motorway, and the like.

The filtering unit 112 derives a risk index for each of recognition results of the objects based on, for example, the driving scenes predicted by the scene prediction unit 111, the recognition results of the plurality of objects around the vehicle V obtained by the recognition unit 113, and risk information acquired from the risk information storage unit 170. The risk information acquired from the risk information storage unit 170 is information in which a risk index is defined for each of the driving scenes and each of types of the object recognition results.

For example, the filtering unit 112 filters the recognition results of the recognition unit 113 by selectively passing a recognition result of an object having a risk index exceeding a prescribed value among the recognition results of the object input from the recognition unit 113 to the route planning unit 114. Details of the risk index, the risk information, and a filtering process of the filtering unit 112 will be described later with reference to FIGS. 3 to 7.

The route planning unit 114 generates the travel route R of the vehicle V based on the recognition result of the object that has passed through the filtering unit 112. In addition, the route planning unit 114 may generate the travel route R based on, for example, the map information acquired from the map information storage unit 180 and the position information of the vehicle V acquired from the position sensor 190 in addition to the recognition result of the object passing through the filtering unit 112.

The route planning unit 114 generates, for example, the travel route R at a lane level in which even lanes of roads on which the vehicle V travels toward a destination are defined. As a result, the scene prediction unit 111 can predict the driving scenes DS1, DS2, and DS3, such as a lane change, straight traveling, and a right or left turn at an intersection, and crosswalk passage, based on the travel route R generated by the route planning unit 114.

The operation planning unit 115 determines a target operation of the vehicle V based on, for example, the recognition result of the object that has passed through the filtering unit 112 and the travel route R generated by the route planning unit 114. The target operation of the vehicle V includes, for example, starting, stopping, changing a lane, and avoiding an obstacle at a certain point.

The travel path generation unit 116 generates a target travel path of the vehicle V based on, for example, the travel route R generated by the route planning unit 114 and the target operation determined by the operation planning unit 115. The target travel path is, for example, a target trajectory or a target locus of the vehicle V, includes a plurality of nodes on the travel route R and a plurality of links connecting adjacent nodes, and is a route on which the vehicle V should actually travel.

For example, the vehicle control unit 117 calculates a command value for causing the vehicle V to perform the target operation determined by the operation planning unit 115 along the target travel path generated by the travel path generation unit 116. For example, the vehicle control unit 117 calculates a command value for each control unit of the power train control unit 120, the brake control unit 130, and the steering control unit 140, and outputs the calculated command value to each control unit.

For example, the power train control unit 120 drives an actuator in accordance with the command value calculated by the vehicle control unit 117 to control a power train of the vehicle V. For example, the brake control unit 130 drives an actuator in accordance with the command value calculated by the vehicle control unit 117 to control a brake of the vehicle V. For example, the steering control unit 140 drives an actuator in accordance with the command value calculated by the vehicle control unit 117 to control steering of the vehicle V.

Hereinafter, operational effects of the electronic control device 110 and the vehicle control system 100 according to the present embodiment will be described.

For example, Ethernet (registered trademark) is used as a communication scheme in the vehicle V. Ethernet (registered trademark) is often used particularly in an autonomous driving vehicle that handles a large volume of data. A communication protocol of Ethernet (registered trademark) is roughly divided into a user datagram protocol (UDP) and a transmission control protocol (TCP).

The UDP is a communication protocol that prioritizes a communication speed, and continues data transmission without confirming success or failure of reception by a transmission destination of data transmitted from a transmission source. Since the UDP does not require confirmation of reception for the transmission destination or retransmission of data to the transmission destination, the communication speed increases as compared with the TCP. However, it is not guaranteed that the data transmitted from the transmission source is received by the transmission destination in the UDP, and thus, reliability is deteriorated as compared with the TCP.

The TCP is a communication protocol that prioritizes the reliability, confirms success or failure of reception by a transmission destination of data transmitted from a transmission source, and retransmits the data from the transmission source to the transmission destination when the transmission destination fails to receive the data. Thus, in the TCP, the communication speed decreases as compared with the UDP, but the data transmitted from the transmission source is reliably received by the transmission destination, so that the reliability of communication increases.

That is, in the vehicle control system 100 and the electronic control device 110, when the UDP is used as the communication protocol of Ethernet (registered trademark), there is a possibility of occurrence of so-called packet loss in which a part of data during communication is lost. For example, if the packet loss occurs in data of the recognition results of the plurality of objects around the vehicle V obtained by the recognition unit 113, there is a possibility that the safety of the vehicle V is deteriorated.

In particular, a communication capacity of the recognition results of the plurality of objects around the vehicle V as outputs of the recognition unit 113 is large, and increases or decreases in accordance with the driving scenes DS1, DS2, and DS3. For example, if the vehicle V is traveling on an expressway or a motorway, the number of objects detected by the external sensor 150 is relatively small, and thus, the communication capacity of the recognition results of the recognition unit 113 is relatively small. However, if the vehicle V travels in an urban area or a downtown, the number of objects detected by the external sensor 150 increases, and thus, the communication capacity of the recognition results of the recognition unit 113 increases, and the packet loss is likely to occur.

Figure 3:
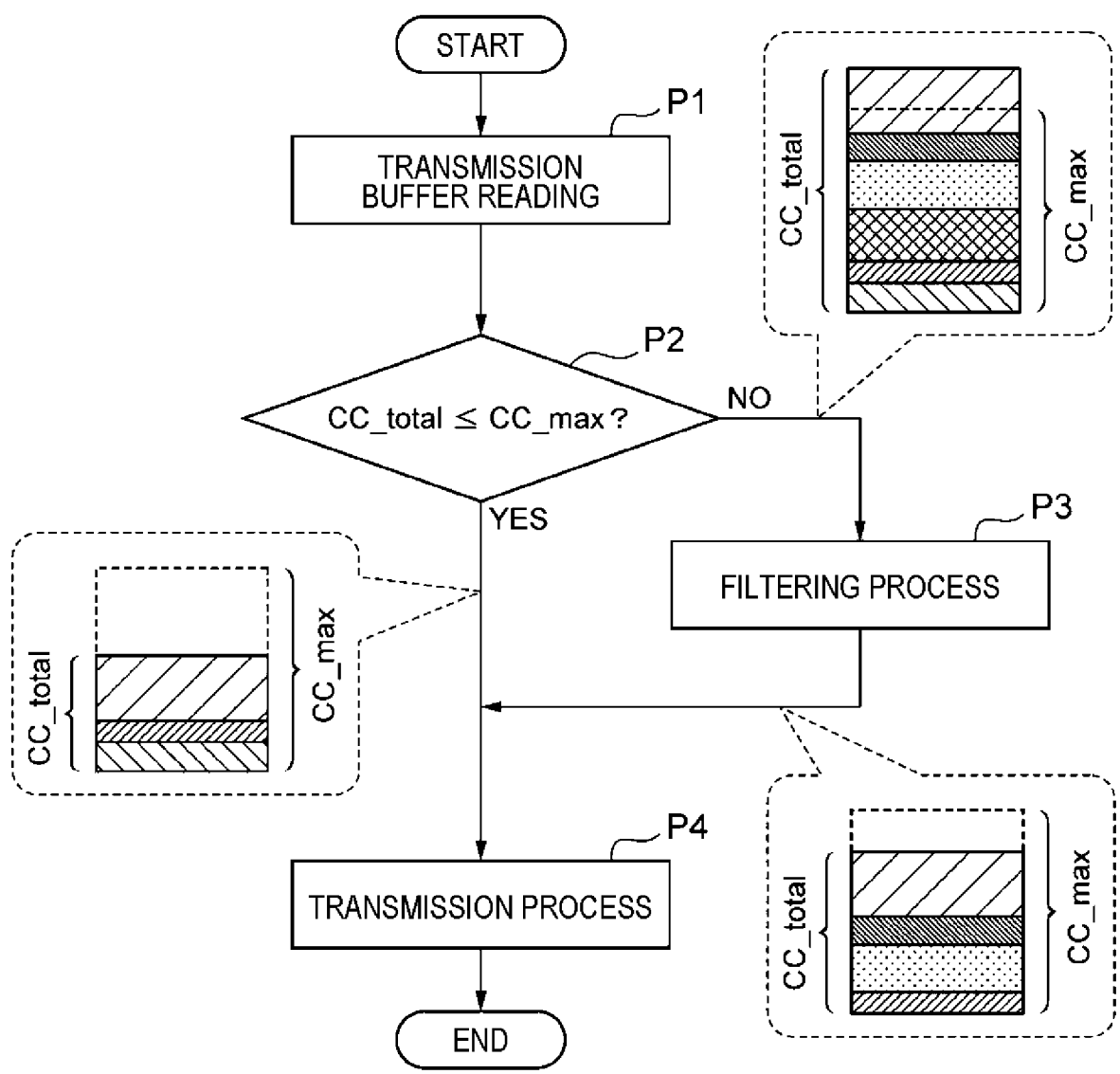
FIG. 3 is a flowchart illustrating a flow of processing by a filtering unit in FIG. 1.

Hereinafter, an operation of the filtering unit 112 for preventing the occurrence of the packet loss as described above in the electronic control device 110 and the vehicle control system 100 according to the present embodiment will be described in detail with reference to FIGS. 3 to 7. FIG. 3 is a flowchart illustrating a flow of processing by the filtering unit 112 in FIG. 1.

When starting the processing illustrated in FIG. 3, the filtering unit 112 executes, for example, a transmission buffer reading process P1. In the process P1, the filtering unit 112 accumulates asynchronous data related to recognition results of a plurality of objects which are output from the recognition unit 113 and sequentially input to the filtering unit 112, for example, in a transmission buffer. Furthermore, the filtering unit 112 reads data related to the recognition results of the plurality of objects accumulated in the transmission buffer, for example, at a predetermined cycle.

Next, the filtering unit 112 executes, for example, a communication capacity determination process P2. In this process P2, for example, the filtering unit 112 calculates a total communication capacity CC_total which is the sum of communication capacities of all pieces of the data read in the transmission buffer reading process P1. Furthermore, the filtering unit 112 reads the maximum communication capacity CC_max stored in advance in the memory, and determines whether or not the total communication capacity CC_total is equal to or less than the maximum communication capacity CC_max. Note that the maximum communication capacity CC_max is desirably set to a value as large as possible within a range where the occurrence frequency of the packet loss is low, for example.

A case is assumed in which the filtering unit 112 determines that the total communication capacity CC_total exceeds the maximum communication capacity CC_max, that is, the inequality of CC_total≤CC_max is not satisfied (NO) in the determination process P2. In this case, the total communication capacity CC_total, which is the sum of communication capacities of pieces of the data related to the recognition results of the plurality of objects, exceeds the maximum communication capacity CC_max with which communication can be performed without causing the packet loss, for example, as illustrated in FIG. 3. Thus, the filtering unit 112 executes a next filtering process P3.

In the filtering process P3, the filtering unit 112 uses, for example, the driving scenes DS1, DS2, and DS3, the recognition results of the plurality of objects, and the risk information respectively acquired from the scene prediction unit 111, the recognition unit 113, and the risk information storage unit 170 illustrated in FIG. 1. Then, the filtering unit 112 selectively passes data related to the recognition result of the object having the risk index exceeding the prescribed value among the recognition results of the plurality of objects. With this filtering process P3, as illustrated in FIG. 3, the total communication capacity CC_total of data to be transmitted from the filtering unit 112 to the route planning unit 114 in a next transmission process P4 can be made equal to or less than the maximum communication capacity CC_max.

Figure 6:
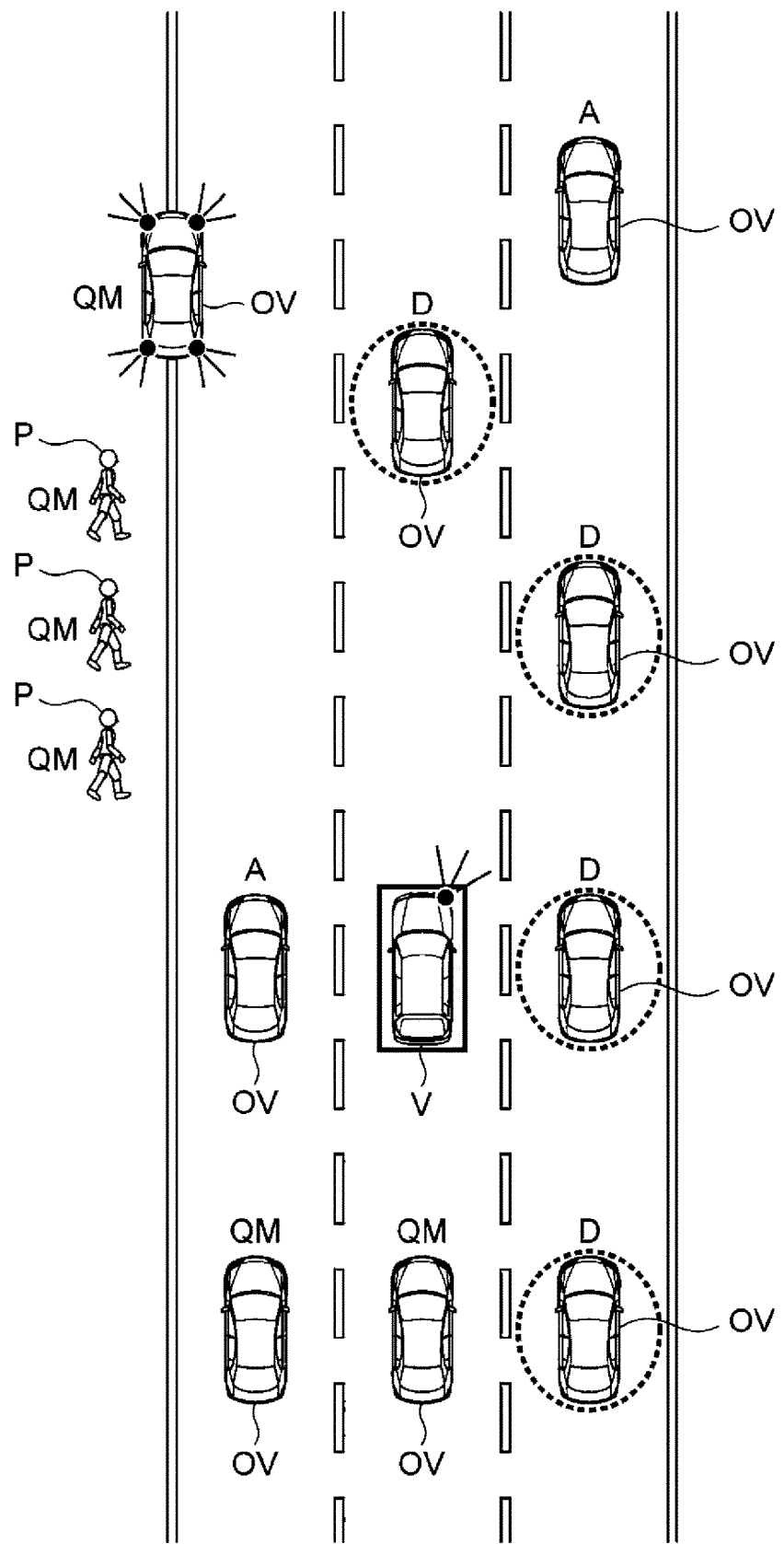
FIG. 6 is a plan view illustrating an example of the filtering process in FIG. 3.
Figure 7:
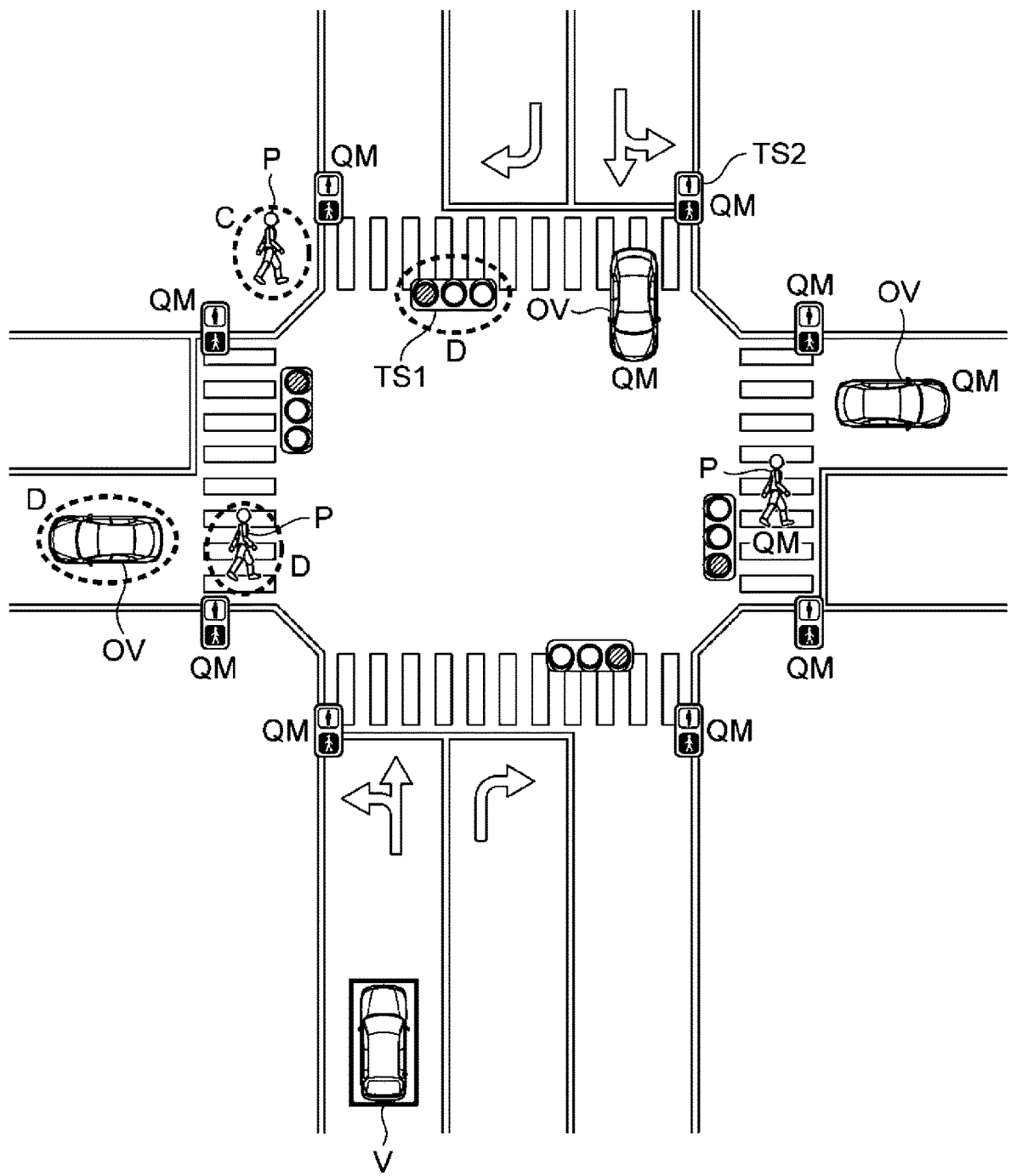
FIG. 7 is a plan view illustrating an example of the filtering process in FIG. 3.

Hereinafter, the risk index, the risk information, and the filtering process P3 will be described in detail with reference to FIGS. 4 to 7. FIGS. 4 and 5 are tables respectively illustrating examples of the risk index and the risk information used in the filtering process P3 in FIG. 3. FIGS. 6 and 7 are plan views respectively illustrating examples of the filtering process P3 in FIG. 3.

As illustrated in Table T5 in FIG. 5, risk indices are defined in pieces of the risk information used in the filtering process P3 for each of types Sgn1, Sgn2, Sgn3, . . . , and SgnN of signals relating to driving scenes and object recognition results. The risk index is, for example, an index indicating a level of a risk that affects the safety of the vehicle V in a case where a recognition result of a certain object is missing. In the risk indices, the risk increases in the order of "A", "B", "C", and "D" from "QM" having the lowest risk regarding the safety of the vehicle. Such risk indices are defined in, for example, the automotive functional safety standard, ISO 26262. In the risk information illustrated in Table T5, the risk index may be dynamically updated by, for example, learning a missing object recognition result by machine learning.

The risk index in the risk information illustrated in Table T5 of FIG. 5 is defined for each of the driving scenes and each of the types of the recognition results of the objects in accordance with, for example, severity, controllability of the vehicle V, and exposure illustrated in Tables T1 to T4 of FIG. 4. Indices S0 to S3 of the severity illustrated in Table T1 of FIG. 4 are, for example, indices each indicating the magnitude of influence on the safety of the vehicle V. The index S0 indicates that there is no influence on the safety of the vehicle V, but the index S3 indicates a large influence on the safety of the vehicle V.

In addition, indices C0 to C3 of the controllability illustrated in Table T2 of FIG. 4 are indices each indicating ease of control of the vehicle V. The index C0 indicates the highest controllability and that even a normal driver can easily control the vehicle V. On the other hand, the index C2 indicates low controllability and that even a skilled driver has difficulty in controlling the vehicle V, and the index C3 indicates that there is no controllability and the vehicle V cannot be controlled. In addition, indices E0 to E4 of the exposure illustrated in Table T3 of FIG. 4 are indices each indicating the occurrence frequency of an event that affects the safety of the vehicle V. The index E0 indicates an extremely rare event having the lowest occurrence frequency, and the index E4 indicates a frequently occurring event having the highest occurrence frequency.

As illustrated in Table T4 of FIG. 4, the risk indices QM, A, B, C, and D are defined in accordance with, for example, a combination of each of the indices S0 to S3 of the severity, each of the indices C0 to C3 of the controllability, and each of the indices E0 to E4 of the exposure illustrated in Tables T1 to T3 of FIG. 4. Note that the risk index is "QM" in a case where the index of the severity is S0, the index of the controllability is C0, or the index of the exposure is E0, which is omitted in Table T4. As illustrated in Table T4, a risk index indicating a higher risk is defined as the severity increases, the controllability decreases, and the exposure increases. The risk index in the risk information illustrated in Table T5 of FIG. 5 is defined in accordance with the combination of the severity, the controllability, and the exposure illustrated in Table T4 of FIG. 4 for each of the driving scenes and each of the types of the recognition results of the objects, for example.

For example, as illustrated in FIG. 6, it is assumed that the vehicle V is traveling in a center lane of a road having three lanes on each side, and a next driving scene predicted by the scene prediction unit 111 is a "lane change" from the center lane to the right lane. In this case, among recognition results of a plurality of objects around the vehicle V obtained by the recognition unit 113, for example, recognition results of other vehicles OV surrounded by broken lines in FIG. 6 correspond to the driving scene "lane change" and the type "Sgn3" in Table T5 of the risk information in FIG. 5, and is assigned with "D" which is the highest risk index. That is, when the driving scene of the vehicle V is the lane change to the right lane, for example, the highest risk index is defined for Sgn3 of the type of recognition results corresponding to the vehicle OV traveling within a predetermined range in the front on the same lane and the vehicles OV traveling within a predetermined range in the front and rear on the right lane.

In addition, in the example illustrated in FIG. 6, for example, "A", which is the lower risk index, is defined as a risk index for a type of recognition results corresponding to a vehicle OV traveling on the left side of the vehicle V and a vehicle OV traveling outside the predetermined range in the front on the right lane. Furthermore, in the example illustrated in FIG. 6, the lowest risk index "QM" is defined for Sgn1 and SgnN of the types of recognition results corresponding to a vehicle OV traveling in the rear on the left lane of the vehicle V, a vehicle OV parked on a side strip of the left lane of the vehicle V, or pedestrians P on a sidewalk on the left side of the road.

In such a case, in the filtering unit 112, a predetermined risk index serving as a threshold of the filtering process P3 can be prescribed to be "QM", "A", "B", or "C" having a lower risk than "D", for example. As a result, the filtering unit 112 can selectively pass the recognition results of the vehicles OV having the risk index "D" exceeding the prescribed risk index among the recognition results of the plurality of objects to the route planning unit 114 in the filtering process P3 described above.

In addition, for example, as illustrated in FIG. 7, it is assumed that vehicle V is traveling on a lane for a left turn and straight traveling on the left side toward an intersection, and next driving scenes predicted by scene prediction unit 111 are a "left turn at an intersection" and "crosswalk passage" immediately after then. In this case, the filtering unit 112 may perform the filtering process P3 assuming that these driving scenes occur at the same time. In the example illustrated in FIG. 7, among recognition results of a plurality of objects around the vehicle V obtained by the recognition unit 113, for example, recognition results of a traffic light TS1 for automobiles ahead of the vehicle V and a vehicle OV traveling on a lane after the left turn, which are surrounded by broken lines, correspond to the driving scene "left turn at an intersection" and the type "Sgn1" in Table T5 of the risk information in FIG. 5, and is assigned with "D" which is the highest risk index.

In addition, among the recognition results of the plurality of objects around the vehicle V obtained by the recognition unit 113, for example, a recognition result of a pedestrian P surrounded by a broken line on a crosswalk through which the vehicle passes at the time of turning left corresponds to the driving scene "crosswalk passage", the type "Sgn1", or "SgnN" in the risk information table T5, and is assigned with "D" which is the highest risk index. Furthermore, among the recognition results of the plurality of objects around the vehicle V obtained by the recognition unit 113, a risk index based on a recognition result of a pedestrian P surrounded by a broken line on a sidewalk adjacent to the crosswalk through which the vehicle passes at the time of turning left, the driving scene "crosswalk passage", and the risk information is defined to be, for example, "C" which is relatively high. In addition, among the recognition results of the plurality of objects around the vehicle V obtained by the recognition unit 113, for example, a recognition results of a traffic light TS2 for pedestrians, vehicles OV, and a pedestrian P, which are not surrounded by broken lines, correspond to the driving scene "crosswalk passage" and the type "Sgn3" in Table T5 of the risk information, and are assigned with "QM" which is the lowest risk index.

In such a case, in the filtering unit 112, a predetermined risk index serving as a threshold of the filtering process P3 can be prescribed to be "QM", "A", or "B" having a lower risk than "C", for example. As a result, the filtering unit 112 can selectively pass the recognition results of the traffic light TS1, the vehicle OV, and the pedestrians P having the risk indices C and D exceeding the prescribed risk index among the recognition results of the plurality of objects to the route planning unit 114 in the filtering process P3 described above.

Note that the filtering unit 112 may selectively pass the recognition result of the object having the risk index exceeding the prescribed risk index, and then appropriately pass a recognition result of an object having a risk index equal to or lower than the prescribed risk index. In addition, in a case where there are a plurality of recognition results of objects having risk indices exceeding the prescribed risk index and the sum of communication capacities of the recognition results exceeds the maximum communication capacity CC_max, the filtering unit 112 may cause the recognition results to pass through the filtering unit 112 in the order of the earliest input timing with respect to the transmission buffer. In addition, in such a case, the filtering unit 112 may appropriately change the order of passage for each of the types Sgn1, Sgn2, Sgn3, . . . , and SgnN of the recognition results of the objects having the same priority.

Thereafter, the filtering unit 112 executes the transmission process P4 illustrated in FIG. 3, and transmits data of the recognition result of the object selectively passed in the filtering process P3 to, for example, the route planning unit 114 illustrated in FIG. 1.

Meanwhile, the filtering unit 112 executes the transmission process P4 when determining that the total communication capacity CC_total is equal to or less than the maximum communication capacity CC_max, that is, the inequality of CC_total≤CC_total is satisfied (YES) in the above-described determination process P2. In the transmission process P4, the filtering unit 112 transmits the recognition results of the plurality of objects having the total communication capacity CC_total being less than the maximum communication capacity CC_max read in the above-described process P1 to, for example, the route planning unit 114 illustrated in FIG. 1.

Hereinafter, operational effects of the electronic control device 110 and the vehicle control system 100 according to the present embodiment will be described.

As described above, the electronic control device 110 of the present embodiment is mounted on the vehicle V, and includes the scene prediction unit 111 and the filtering unit 112. As described above, the scene prediction unit 111 predicts the driving scenes DS1, DS2, and DS3 to be encountered by the vehicle V based on the position information of the vehicle V, the map information around the vehicle V, and the travel route R of the vehicle V. The filtering unit 112 derives a risk index for each of the recognition results of the plurality of objects around the vehicle V based on the driving scenes DS1, DS2, and DS3, the recognition results of the objects, and risk information in which the risk index is defined for each of the driving scenes DS1, DS2, and DS3 and each of the types of the recognition results of the objects. Furthermore, the filtering unit 112 selectively passes the recognition result of the object having the risk index exceeding the prescribed value.

With such a configuration, the electronic control device 110 of the present embodiment can predict, using the scene prediction unit 111, the driving scenes DS1, DS2, and DS3 in which the total communication capacity of the recognition results obtained by the recognition unit 113 is likely to increase, such as the straight traveling or the right or left turn at the intersection in the residential area or the downtown. Then, the filtering unit 112 can derive the risk index for each of the types Sgn1, Sgn2, Sgn3, . . . , and SgnN of the recognition results of the objects based on the predicted driving scenes DS1, DS2, and DS3, the recognition results of the plurality of objects around the vehicle V, and the risk information as illustrated in Table T5 in FIG. 5.

As a result, the filtering unit 112 can perform the filtering process P3 to selectively pass the recognition result of the object having the risk index exceeding the prescribed value as illustrated in FIG. 3. As a result, the total communication capacity CC_total exceeding the maximum communication capacity CC_max at which the packet loss is likely to occur is reduced to the total communication capacity CC_total being equal to or less than the maximum communication capacity CC_max, and it is possible to prevent missing of a recognition result of an object that is likely to affect the safety of the vehicle V. Therefore, according to the present embodiment, it is possible to provide the electronic control device 110 capable of coping with an increase in communication load, caused by an increase in the number of objects to be monitored, and an increase in processing load at the time of acquiring surrounding monitoring information.

In addition, in the electronic control device 110 of the present embodiment, the risk indices QM, A, B, C, and D in the risk information illustrated in Table T5 of FIG. 5 are defined in accordance with the severity, the controllability of the vehicle V, and the exposure as illustrated in Table T4 of FIG. 4 for each of the driving scenes and each of the types Sgn1, Sgn2, Sgn3, . . . , and SgnN of the recognition results of the objects.

With such a configuration, the electronic control device 110 of the present embodiment can identify a type of a recognition result of an object that affects the safety of the vehicle for each of the driving scenes, selectively pass the recognition result, and improve the safety of the vehicle V using the filtering unit 112. In addition, the filtering unit 112 can further improve the safety of the vehicle V by preferentially passing a type of a recognition result having higher severity, lower controllability, and higher exposure.

In addition, in the electronic control device 110 of the present embodiment, the driving scenes include the straight traveling, the left turn and the right turn at the intersection, the lane change, and the crosswalk passage.

With such a configuration, the electronic control device 110 of the present embodiment can set the risk index of the recognition result of the object in accordance with each of the driving scenes of the straight traveling, the left turn and the right turn at the intersection, the lane change, and the crosswalk passage. As a result, the safety of the vehicle V can be further improved in each of the driving scenes.

In addition, the electronic control device 110 of the present embodiment includes the recognition unit 113 and the route planning unit 114. The recognition unit 113 outputs the recognition results obtained by recognizing the plurality of objects around the vehicle V using the detection result of the external sensor 150 mounted on the vehicle V to the filtering unit 112. The route planning unit 114 generates the travel route R of the vehicle V based on the recognition result of the object that has passed through the filtering unit 112.

With such a configuration, the electronic control device 110 of the present embodiment can filter the recognition results of the objects recognized by the recognition unit 113 by the filtering unit 112 and pass the recognition result of the object having the risk index exceeding the prescribed value to the route planning unit 114. As a result, it is possible to prevent the missing of the recognition result of the object that may affect the safety of the vehicle V and to generate a safer travel route R by the route planning unit 114.

In addition, the electronic control device 110 of the present embodiment includes the operation planning unit 115, the travel path generation unit 116, and the vehicle control unit 117. The operation planning unit 115 determines the target operation of the vehicle V based on the recognition result of the object that has passed through the filtering unit 112 and the travel route R. The travel path generation unit 116 generates the target travel path of the vehicle V based on the travel route R and the target operation. The vehicle control unit 117 calculates the command value for causing the vehicle V to perform the target operation.

With such a configuration, the electronic control device 110 of the present embodiment generates the target operation and the target travel path and derive the command value using the operation planning unit 115, the travel path generation unit 116, and the vehicle control unit 117 based on the travel route R generated by the route planning unit 114. Here, the travel route R generated by the route planning unit 114 is a highly safe travel route R that reflects the object exceeding the predetermined risk index in accordance with to the driving scene as described above. Therefore, the safety of the vehicle V can be further improved by controlling the vehicle V based on this travel route R.

In addition, the vehicle control system 100 of the present embodiment includes the electronic control device 110 described above, the power train control unit 120, the brake control unit 130, and the steering control unit 140. The power train control unit 120 controls the power train of the vehicle V in accordance with the command value output from the vehicle control unit 117. The brake control unit 130 controls the brake of the vehicle V in accordance with the command value output from the vehicle control unit 117. The steering control unit 140 controls the steering of the vehicle V in accordance with the command value output from the vehicle control unit 117.

With such a configuration, the vehicle control system 100 of the present embodiment can prevent, by the electronic control device 110, missing of a recognition result of an object exceeding a predetermined risk index in accordance with the driving scene from among the recognition results of the objects obtained by the recognition unit 113. In addition, advanced driving assistance and autonomous driving can be performed by generating the travel route R, the target operation, the target travel path, and the command value of the vehicle V based on the recognition result of the object exceeding the predetermined risk index and controlling the power train, the brake, and the steering of the vehicle V. Therefore, according to the present embodiment, it is possible to provide the vehicle control system 100 capable of coping with an increase in communication load, caused by an increase in the number of objects to be monitored, and an increase in processing load at the time of acquiring surrounding monitoring information.

Although the embodiment of the electronic control device and the vehicle control system according to the present disclosure has been described in detail with reference to the drawings as above, a specific configuration is not limited to the embodiment, and design alterations or the like made in a scope not departing from a gist of the present disclosure is included in the present disclosure.

REFERENCE SIGNS LIST 100 vehicle control system
110 electronic control device
111 scene prediction unit
112 filtering unit
113 recognition unit
114 route planning unit
115 operation planning unit
116 travel path generation unit
117 vehicle control unit
120 power train control unit
130 brake control unit
140 steering control unit
150 external sensor A risk Index
B risk Index
C risk Index
D risk Index
DS1 driving scene
DS2 driving scene
DS3 driving scene
QM risk Index
R travel route
V vehicle

The invention claimed is:

1. An electronic control device mounted on a vehicle, the electronic control device one or more processors configured to:
- predict driving scenes to be encountered by the vehicle based on position information of the vehicle, map information around the vehicle, and a travel route of the vehicle;
- determine a total communication capacity by combining communication capacities of recognition results of a plurality of objects around the vehicle;
- compare the total communication capacity to a maximum communication capacity:
- after determining that the total communication capacity is greater than or equal to the maximum communication capacity, derive a risk index for each of the recognition results of the plurality of objects around the vehicle based on the driving scenes, the recognition results of the objects, and risk information in which the risk index is defined for each of the driving scenes and each type of the recognition results of the plurality of objects, selectively pass at least one recognition result of at least one object having the risk index exceeding a prescribed value, and determine the total communication capacity by combining communication capacities of the at least one recognition result of the at least one passed object to decrease the total communication capacity; and
- after determining that the total communication capacity is less than the maximum communication capacity, generate the travel route of the vehicle based on the at least one recognition result of the at least one passed object or the recognition results of the plurality of objects.

2. The electronic control device according to claim 1, wherein the risk index is defined in accordance with severity, controllability of the vehicle, and exposure for each of the driving scenes and each of the types of the recognition results.

3. The electronic control device according to claim 1, wherein the driving scenes include straight traveling at an intersection, a left turn and a right turn, a lane change, and crosswalk passage.

4. The electronic control device according to claim 1, the one or more processors further configured to:
- output the recognition results obtained by recognizing the plurality of objects around the vehicle using a detection result of an external sensor mounted on the vehicle.

5. The electronic control device according to claim 4, the one or more processors further configured to:
- determine a target operation of the vehicle based on the at least one recognition result of the at least one passed object and on the travel route;
- generate a target travel path of the vehicle based on the travel route and the target operation; and
- calculate a command value for causing the vehicle to perform the target operation.

6. A vehicle control system comprising:
- the electronic control device according to claim 5;
- a power train controller that controls a power train of the vehicle in accordance with the command value;
- a brake controller that controls a brake of the vehicle in accordance with the command value; and
- a steering controller that controls a steering of the vehicle in accordance with the command value.

* * * * *